US011019459B1

(12) United States Patent
Goldberg

(10) Patent No.: US 11,019,459 B1
(45) Date of Patent: May 25, 2021

(54) METHOD, APPARATUS, AND SYSTEM FOR BASE STATION SELECTION FOR DIFFERENTIAL POSITIONING

(71) Applicant: HERE Global B.V., Eindhoven (NL)

(72) Inventor: Elizabeth Goldberg, Oakland, CA (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/736,109

(22) Filed: Jan. 7, 2020

(51) Int. Cl.
| | |
|---|---|
| *H04W 4/029* | (2018.01) |
| *H04L 29/08* | (2006.01) |
| *H04W 36/30* | (2009.01) |
| *H04W 64/00* | (2009.01) |
| *H04W 36/14* | (2009.01) |
| *H04W 84/04* | (2009.01) |
| *H04W 36/32* | (2009.01) |

(52) U.S. Cl.
CPC ............. *H04W 4/029* (2018.02); *H04L 67/18* (2013.01); *H04W 36/14* (2013.01); *H04W 36/30* (2013.01); *H04W 36/32* (2013.01); *H04W 64/003* (2013.01); *H04W 84/045* (2013.01)

(58) Field of Classification Search
CPC ..... H04W 4/029; H04W 4/023; H04W 64/00; G01C 21/26; G01S 19/04; G01S 19/07; G01S 1/022; G01S 1/026; G01S 5/02; G01S 5/021; G01S 5/0215; G01S 5/0252; G01S 19/071; G01S 19/072; G01S 5/009; G01S 5/14; G01S 1/00; G01S 1/02; G01S 5/00; H04L 29/06; H04L 67/04; H04L 67/16; H04L 67/18; H04L 67/22; H04L 69/329; H04L 29/08
See application file for complete search history.

(56) References Cited

U.S. PATENT DOCUMENTS

| | | | | | |
|---|---|---|---|---|---|
| 5,323,322 | A | * | 6/1994 | Mueller | ................ G01S 5/0009 342/357.27 |
| 5,638,077 | A | * | 6/1997 | Martin | .................... G01S 5/009 342/357.44 |

(Continued)

FOREIGN PATENT DOCUMENTS

| | | |
|---|---|---|
| CN | 106646570 A | 5/2017 |
| WO | 2018158125 A1 | 9/2018 |
| WO | 2018188848 A1 | 10/2018 |

OTHER PUBLICATIONS

Shi, Chuang, et al. "Precise orbit determination of Beidou Satellites with precise positioning." Science China Earth Sciences 55.7 (2012): 1079-1086. (Year: 2012).*

*Primary Examiner* — Nathan S Taylor
(74) *Attorney, Agent, or Firm* — Ditthavong, Steiner & Mlotkowski

(57) ABSTRACT

An approach is provided for base station selection for differential positioning. The approach, for example, involves determining a trajectory of a positioning receiver. The positioning receiver provides data for using a differential positioning system to determine location data. The approach also involves selecting one or more locations along the trajectory. The approach further involves scanning a base station network to find one or more base stations for the one or more locations. The one or more base stations provide location correction data for differential positioning. The approach further involves providing a list of the one or more base stations for performing the differential positioning.

20 Claims, 11 Drawing Sheets

(56) References Cited

U.S. PATENT DOCUMENTS

| | | | | |
|---|---|---|---|---|
| 5,729,457 A * | 3/1998 | Seymour | G01S 19/41 | |
| | | | 340/990 | |
| 5,764,184 A * | 6/1998 | Hatch | G01S 5/009 | |
| | | | 342/357.24 | |
| 5,884,220 A | 3/1999 | Farmer et al. | | |
| 6,101,390 A * | 8/2000 | Jayaraman | G01C 21/26 | |
| | | | 455/456.1 | |
| 6,324,474 B1 * | 11/2001 | Beisner | G01S 19/07 | |
| | | | 342/357.31 | |
| 6,529,830 B1 * | 3/2003 | Eschenbach | G01S 5/009 | |
| | | | 342/357.24 | |
| 6,751,467 B1 * | 6/2004 | Cameron | G01S 19/07 | |
| | | | 455/516 | |
| 7,089,113 B1 * | 8/2006 | Janky | G01S 19/04 | |
| | | | 342/357.31 | |
| 7,110,762 B1 * | 9/2006 | Cameron | G01C 15/00 | |
| | | | 342/357.27 | |
| 8,803,735 B2 | 8/2014 | McClure | | |
| 9,182,942 B2 * | 11/2015 | Kelly | G06F 7/00 | |
| 9,405,010 B2 | 8/2016 | Appleford et al. | | |
| 2002/0186165 A1 * | 12/2002 | Eschenbach | G01S 19/09 | |
| | | | 342/357.46 | |
| 2002/0198657 A1 * | 12/2002 | Robbins | G01S 19/04 | |
| | | | 701/469 | |
| 2004/0111212 A1 * | 6/2004 | Broeck | G01C 23/00 | |
| | | | 701/533 | |
| 2005/0003842 A1 * | 1/2005 | Harju | H04W 24/08 | |
| | | | 455/502 | |
| 2005/0110676 A1 * | 5/2005 | Heppe | G01S 19/07 | |
| | | | 342/357.34 | |
| 2006/0064244 A1 * | 3/2006 | Robbins | G01C 15/00 | |
| | | | 701/471 | |
| 2007/0052583 A1 * | 3/2007 | Zhodzishsky | G01S 19/43 | |
| | | | 342/357.24 | |
| 2007/0085734 A1 * | 4/2007 | Whitehead | G01S 19/07 | |
| | | | 342/357.24 | |
| 2007/0200753 A1 * | 8/2007 | Fuchs | G01S 19/27 | |
| | | | 342/357.66 | |
| 2008/0122687 A1 * | 5/2008 | Nelson | G01S 19/04 | |
| | | | 342/357.27 | |
| 2009/0109061 A1 * | 4/2009 | McNew | G08G 1/164 | |
| | | | 340/928 | |
| 2012/0194389 A1 * | 8/2012 | Faragher | G01S 5/02 | |
| | | | 342/463 | |
| 2013/0293412 A1 * | 11/2013 | Appleford | G01S 19/41 | |
| | | | 342/357.23 | |
| 2016/0026185 A1 * | 1/2016 | Smith | G05D 1/0259 | |
| | | | 356/614 | |
| 2016/0109551 A1 * | 4/2016 | Faragher | G05D 1/0278 | |
| | | | 701/23 | |
| 2016/0154108 A1 * | 6/2016 | McClure | G01S 19/13 | |
| | | | 342/357.44 | |
| 2017/0090479 A1 * | 3/2017 | Wilcox | G05D 1/0219 | |
| 2018/0120445 A1 * | 5/2018 | Dill | G01S 19/04 | |

\* cited by examiner

METHOD, APPARATUS, AND SYSTEM FOR BASE STATION SELECTION FOR DIFFERENTIAL POSITIONING

BACKGROUND

Satellite-based positioning systems (e.g., a Global Navigation Satellite System (GNSS) such as but not limited to Global Positioning System (GPS), GLONASS, etc.) typically use positioning receivers that track satellites in the sky and then use the tracking data for positioning calculations. However, various errors associated with the receivers and/or satellites (e.g., clock errors, atmospheric delay, signal obstructions, etc.) can limit the accuracy of these satellite-based positioning systems. One approach to improving positioning error is to use a differential positioning system (e.g., Differential GNSS) to adjust the satellite tracking data observed by positioning receivers based on positioning measurements made at reference stations (e.g., base stations at various fixed locations that are known with high accuracy). For increased accuracy, the errors experienced at the base stations should be as similar as possible to the errors experienced by the positioning receiver. As a result, there are significant technical challenges associated with selecting reference or base stations for differential positioning, particularly when the positioning receiver is in motion over areas where positioning errors can vary.

SOME EXAMPLE EMBODIMENTS

Therefore, there is a need for an approach for selecting base stations for differential positioning.

According to one embodiment, a method comprises determining a trajectory of a positioning receiver. The positioning receiver provides data for using a differential positioning system to determine location data. The method also comprises selecting one or more locations along the trajectory. The method further comprises scanning a base station network to find one or more base stations for the one or more locations. The one or more base stations provide location correction data for differential positioning. The method further comprises providing a list of the one or more base stations for performing the differential positioning.

According to another embodiment, an apparatus comprises at least one processor, and at least one memory including computer program code for one or more computer programs, the at least one memory and the computer program code configured to, with the at least one processor, cause, at least in part, the apparatus to determine a trajectory of a positioning receiver. The positioning receiver provides data for using a differential positioning system to determine location data. The apparatus is also caused to select one or more locations along the trajectory. The apparatus is further caused to scan a base station network to find one or more base stations for the one or more locations. The one or more base stations provide location correction data for differential positioning. The apparatus is further caused to provide a list of the one or more base stations for performing the differential positioning.

According to another embodiment, a non-transitory computer-readable storage medium carries one or more sequences of one or more instructions which, when executed by one or more processors, cause, at least in part, an apparatus to determine a trajectory of a positioning receiver. The positioning receiver provides data for using a differential positioning system to determine location data. The apparatus is also caused to select one or more locations along the trajectory. The apparatus is further caused to scan a base station network to find one or more base stations for the one or more locations. The one or more base stations provide location correction data for differential positioning by the positioning receiver. The apparatus is further caused to provide a list of the one or more base stations for performing the differential positioning.

According to another embodiment, an apparatus comprises means for determining a trajectory of a positioning receiver. The positioning receiver provides data for using a differential positioning system to determine location data. The apparatus also comprises means for selecting one or more locations along the trajectory. The apparatus further comprises means for scanning a base station network to find one or more base stations for the one or more locations. The one or more base stations provide location correction data for differential positioning. The apparatus further comprises means for providing a list of the one or more base stations for performing the differential positioning.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for base station selection for differential positioning are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
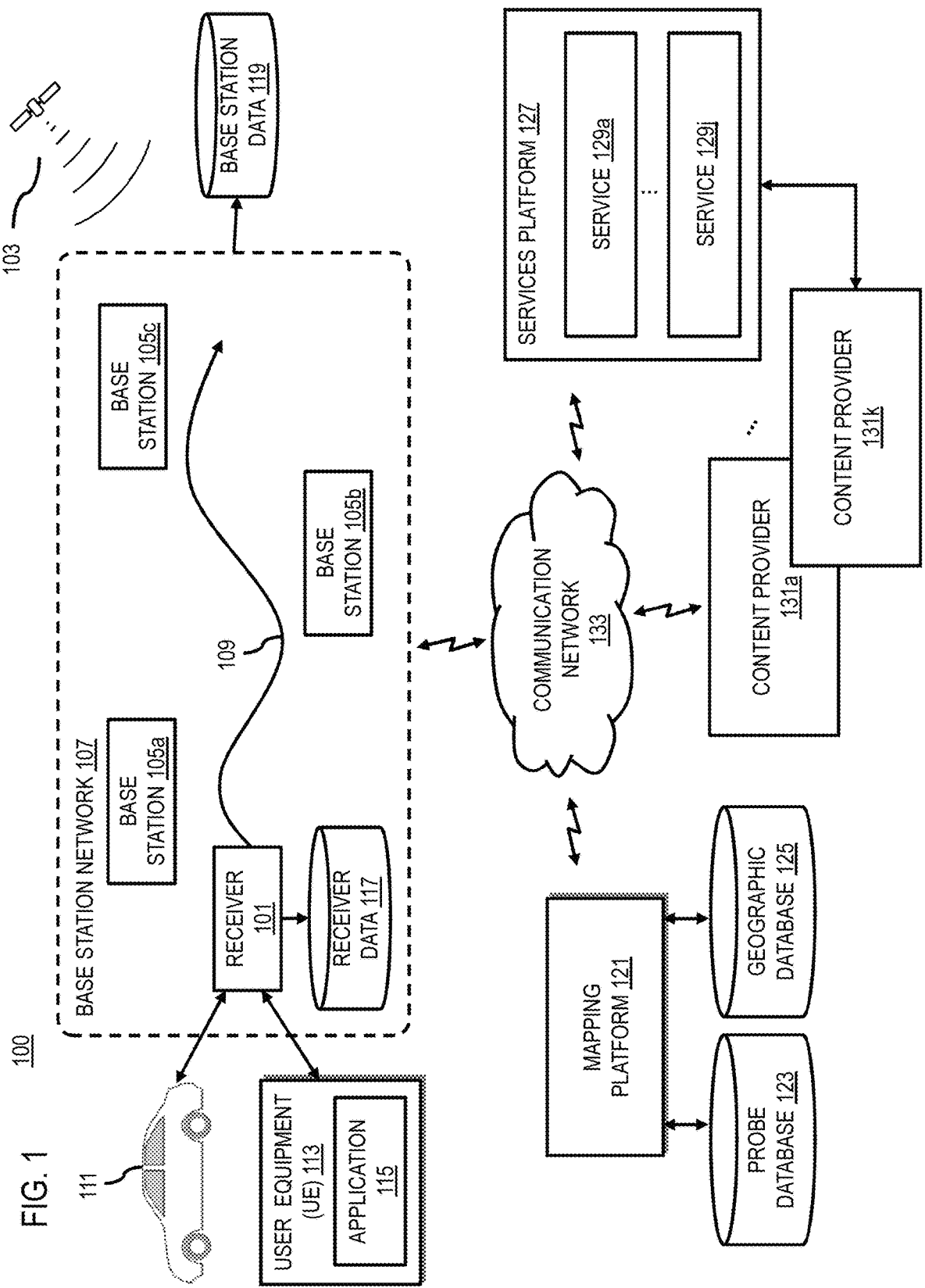
FIG. 1 is a diagram of a system capable of base station selection for differential positioning, according to one embodiment.

FIG. 1 is a diagram of a system capable of base station selection for differential positioning, according to one embodiment. Satellite-based positioning systems generally use a positioning receiver to receive time signals transmitted from satellites orbiting the Earth to calculate the position (e.g., longitude, latitude, and altitude) of the receiver. A positioning system that operates a constellation of satellites to provide global coverage can be referred to as a Global Navigation Satellite System (GNSS). Examples of a GNSS include but are not limited to Global Positioning System (GPS), Globalnaya Navigazionnaya Sputnikovaya Sistema (GLONASS), Galileo, Beidou, etc. It is noted that although the various embodiments described herein are discussed with respect to a GNSS system, it is contemplated that the embodiments are also applicable to regional positioning systems that do not provide global coverage.

Generally, a positioning receiver (e.g., receiver 101) tracks satellites (e.g., satellite 103) in the sky and those measurements are used for positioning calculations. The tracking includes, for instance, receiving one-way time signals from satellites 103 that are part of a constellation of positioning satellites orbiting the Earth. For example, with GNSS positioning, trilateration to four or more satellites 103 can provide a position on the Earth. However, without improvement that position is generally only accurate to about 3-10 m. There are many factors that contribute to GNSS positioning error, some of which include but are not limited to: satellite clock error, receiver clock error, atmospheric delay, satellite orbit error, poor satellite geometry, multipath and signal obstruction.

One method of error mitigation and improvement of satellite-based positioning accuracy (e.g., GNSS positioning accuracy) is differential positioning (e.g., differential GNSS (DGNSS)). Differential positioning uses measurements made at reference stations (also referred to as base stations such as base stations 105a-105c of a base station network 107) to adjust the observed GNSS signals at the receiver 101. The locations of the reference or base stations 105a-105c (also collectively referred to as base stations 105) are known with a high accuracy (e.g., based on surveying methods, high accuracy positioning technology, etc.). In this way, the measurements of the GNSS signals taken at a reference station 105 can be used to determine the difference between the position of the reference station 105 indicated by the GNSS and its known fixed position. DGNSS can then use this difference (e.g., broadcast from the base stations 105 as a correction signal) to reduce atmospheric error (e.g., ionospheric and tropospheric error), satellite orbit error, satellite clock error, and/or any other types of errors that both the base station 105 and the positioning receiver 101 mutually experience.

As noted, base stations 105 are fixed locations on Earth. Base stations 105 generally are continuously collecting GNSS signals to compare against the fixed positions of the base stations 105 which are very accurately known. Thus, any difference between the known location of a base station 105 and the location determined using GNSS signals represent the sources of error experienced at the location of the base station 105 (e.g., atmospheric error, etc.). Therefore, a base station 105 and a positioning receiver 101 that are nearby each other both experience nearly identical atmospheric error, satellite orbit error, satellite clock error, etc. Since the base station 105's location is known, the errors experienced by the base station 105 can be computed, and then almost eliminated or reduced from the receiver 101's positioning measurements using differential positioning (e.g., DGNSS).

Ideally, the base station 105 used in differential positioning is as close to the receiver 101 as possible. This is because the shorter the distance between the base station 105 and the receiver 101, the more similar the errors they both experience are. This increased similarity of errors leads to increased differential positioning accuracy. Therefore, the selection of which base station 105 to use for differential positioning for a given positioning receiver 101 can affect the accuracy of DGNSS.

While selection of base stations 105 can be straight forward when the positioning receiver 101 is static (e.g., select the base station 105 with the shortest distance to the receiver 101), it is not so when the receiver 101 is moving or has moved along a trajectory 109. In that case, the receiver 101 may move very far from the selected base station 105, degrading the accuracy of the computed position. For example, as shown in FIG. 1, at the start of the trajectory 109, the receiver 101 is closest to base station 105*a*. However, at the end of the trajectory 109, the receiver 101 has moved to being closer to base station 105*c* so that the original base station 105*a* may not provide the best approximation of the errors that are experienced by receiver 101 later along the trajectory 109. Poor selection of additional base stations 105 can cause unnecessary processing time increases or even entire processing failures. Therefore, when the receiver 101 is moving or has moved (e.g., when equipped in a vehicle 111 and/or user equipment (UE) or device 113 executing a mapping application 115), there are significant technical challenges to ensuring a proper evaluation of base station data quality and base station location with respect to the trajectory. These technical challenges are particularly acute in use cases where positioning data from the receivers 101 are used in a large automated production environment (e.g., a digital mapping environment such as that described with respect to FIG. 6 below) in which the selection of base stations 105 for differential positioning are to be optimized for speed, performance, repeatability, and positioning accuracy.

To address these technical challenges, the system 100 of FIG. 1 introduces a capability to select multiple base stations 105 for processing (e.g., post-processing and/or real-time processing) receiver data 117 (e.g., GNSS time signal data) determined by positioning receivers 101 over a movement trajectory 109. In one embodiment, the selection of the base stations 105 can be based on the relative positions of the base stations 105 to the trajectory 109 and/or to each other. The base station data 119 from the selected base stations 105 (e.g., the measured differences between known fixed positions of the base stations 105 and respective positions as determined from GNSS signals alone) can then be used to apply differential correction on the receiver data 117 to improve accuracy. In one embodiment, the system 100 can also reject base stations 105 that add no value (e.g., does not increase positioning accuracy over GNSS signals alone) or degrade it (e.g., decreases positioning accuracy over GNSS signals alone). For example, the system 100 can discriminate between base stations 105 with available data (e.g., available positioning correction data for the date and/or time of the trajectory 109) and those without, rejecting the latter and prioritizing the former.

When differential correction is applied to the receiver data 117 (e.g., GNSS measurements) from a receiver 101 on a trajectory 109 (e.g., moving along a roadway), employment of multiple base stations 105 according to the embodiments described herein provides significant advantages. For example, they not only reduce observed measurement errors, but also gaps in base station data 119. They mitigate distant dependent error from one project area to another. They speed re-connection when satellite tracking is lost due to overhead obstruction, and return the measurements to high accuracy more quickly than is possible when differential correction depends on a single base station 105.

Figure 2:
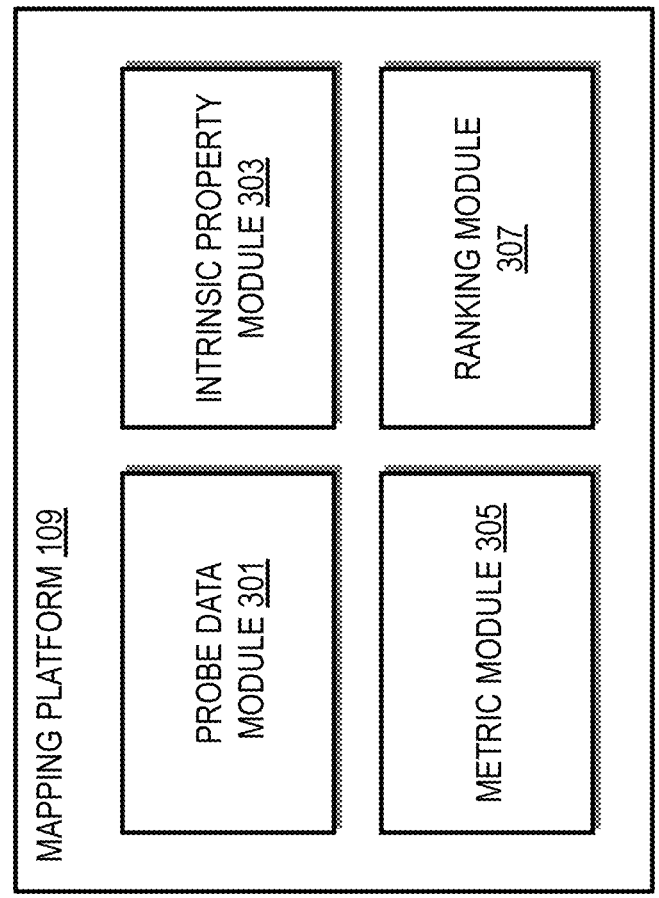
FIG. 2 is a diagram of components of a mapping platform capable of base station selection for differential positioning, according to one embodiment.

Progressing from single-base station DGNSS to multi-base station DGNSS also provides other advantages, especially for longer receiver data path trajectories and/or trajectories that move into new geographic regions. For example, the implementation of multiple base station over a single base station differential processing reduces observed measurement errors and gaps in base station data. It helps mitigate distant dependent error as the receiver 101 moves from one project area to another, and allows re-establishment of high accuracy quickly after complete loss of GNSS tracking. Multiple base stations 105 spread through the project area (e.g., in a base station network 107) help the GNSS receiver 101 to return to high accuracy quickly through integer ambiguity determination, which might not be possible with a single base station 105 and the loss of lock occurs far from the base station 105. The system 100 offers the realization of these advantages by optimizing base station selection, validation and implementation for maximum speed, performance, repeatability and positioning accuracy making the employment of multiple base stations 105 efficient in a large automated production environment In one embodiment, the system 100 includes a mapping platform 121 to perform one or more functions associated with base station selection for differential positioning. FIG. 2 is a diagram of components of the mapping platform 121, according to one embodiment. By way of example, the mapping platform 121 includes one or more components for base station selection for differential positioning. It is contemplated that the functions of these components may be combined in one or more components or performed by other components of equivalent functionality. In one embodiment, the mapping platform 121 includes a trajectory module 201, an interval module 203, a selection module 205, and an output module 207. The above presented modules and components of the mapping platform 121 can be implemented in hardware, firmware, software, or a combination thereof. Though depicted as a separate entity in FIG. 1, it is contemplated that the mapping platform 121 may be implemented as a module of any of the components of the system 100. In another embodiment, the mapping platform 121 and/or one or more of the modules 201-207 may be implemented as a cloud-based service, local service, native application, or combination thereof. The functions of the mapping platform 121 and/or the modules 201-207 are discussed with respect to FIGS. 3-7 below.

Figure 3:
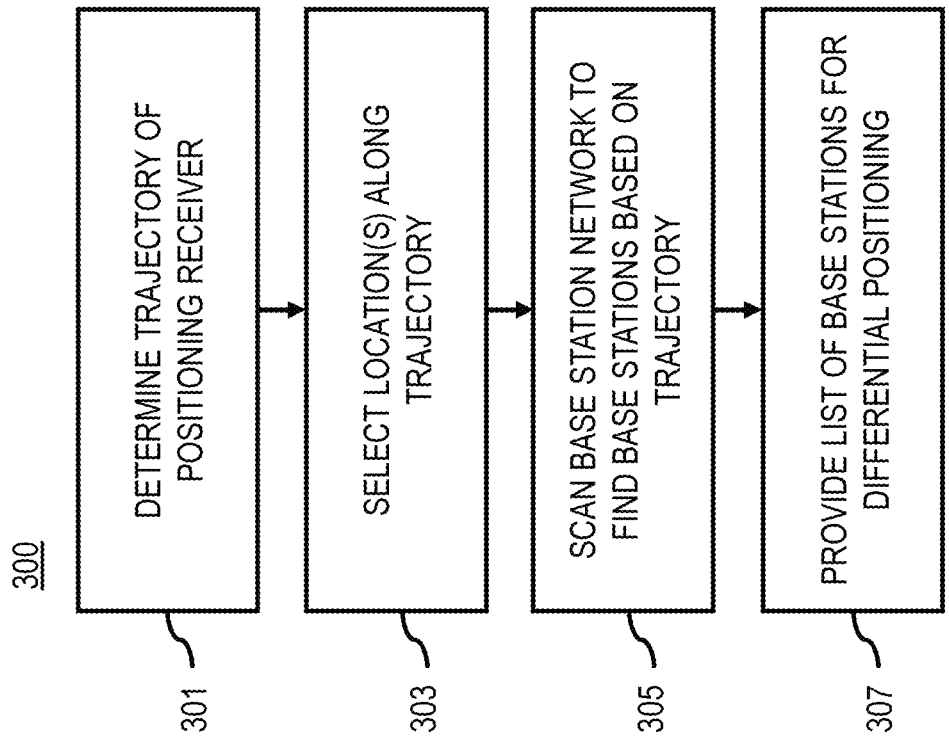
FIG. 3 is a flowchart of a process for base station selection for differential positioning, according to one embodiment.
Figure 9:
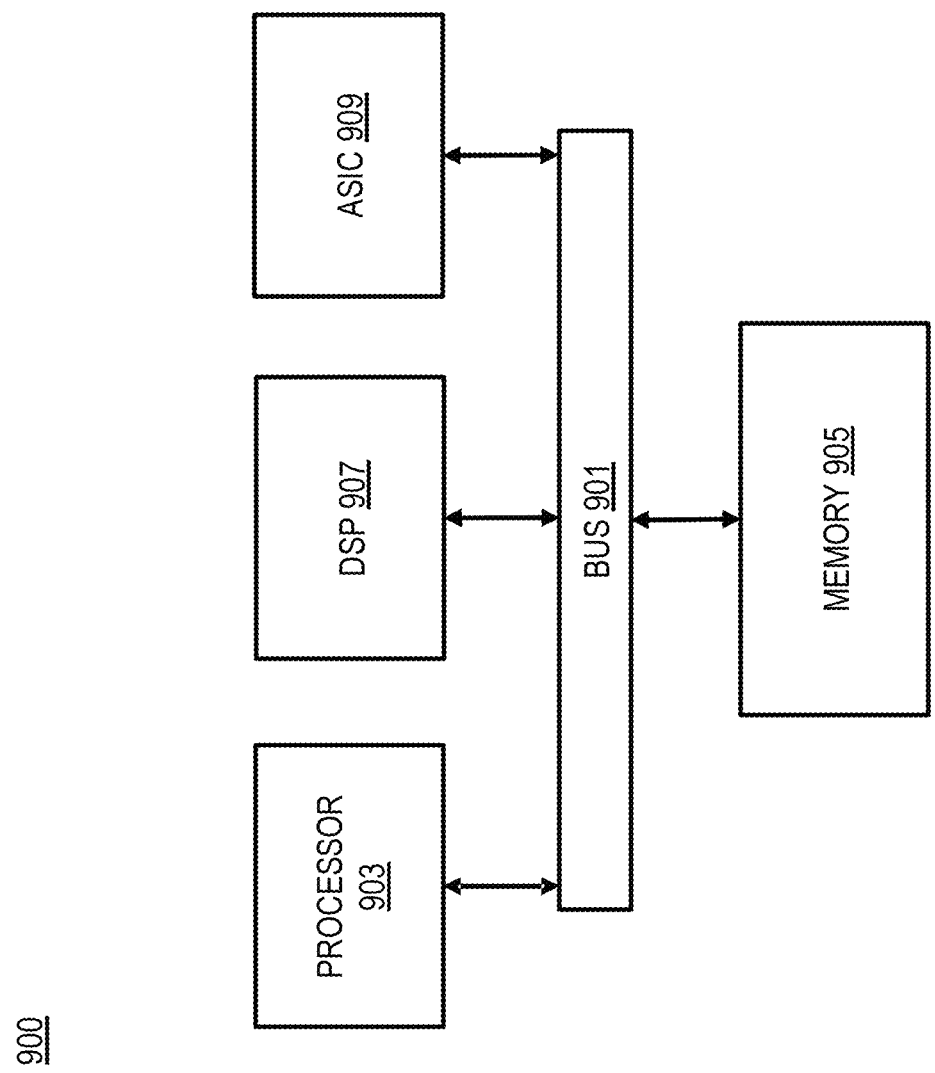
FIG. 9 is a diagram of a chip set that can be used to implement an embodiment.

FIG. 3 is a flowchart of a process for base station selection for differential positioning, according to one embodiment. In various embodiments, the mapping platform 121 and/or the modules 201-207 may perform one or more portions of the process 300 and may be implemented in, for instance, a chip set including a processor and a memory as shown in FIG. 9. As such, the mapping platform 121 and/or modules 201-207 can provide means for accomplishing various parts of the process 300, as well as means for accomplishing embodiments of other processes described herein in conjunction with other components of the system 100. Although the process 300 is illustrated and described as a sequence of steps, it is contemplated that various embodiments of the process 300 may be performed in any order or combination and need not include all of the illustrated steps.

In step 301, the trajectory module 201 determines a trajectory 109 of positioning receiver 101. As noted above, the positioning receiver 101 uses use a differential positioning system or can provide receiver data 117 for a differential positioning system to determine location data. It is contemplated that the trajectory module 201 can use any means to determine the path taken by a positioning receiver 101. In a post-processing use case, the trajectory can be determined by the data path trajectory indicated by the location data generated from the positioning receiver 101. For example, probe data can be collected (e.g., over a communication network 133) from probe devices (e.g., vehicles 111, UEs 113, etc.) traveling in a road network and stored in a probe database 123. The probe data can include probe points that indicate locations sampled by a positioning receiver 101 (e.g., GNSS receiver) of a probe device. The probe points typically include a GNSS determined position (e.g., latitude, longitude, altitude, timestamp of when the position was determined, and a probe identifier (ID) uniquely identifying the probe device. Based on this data, the corresponding trajectory 109 can be determined by sequencing the probe points associated with a probe ID according to time. In this way, the trajectory 109 for a given probe ID or positioning receiver 101 associated with the probe ID can be constructed from the sequence of probe points and the time span associated with the probe points.

In another use case, the trajectory 109 of the positioning receiver 101 can be determined in real time. In one embodiment, the trajectory 109 can be determined or predicted based on an anticipated travel route of the positioning receiver 101 or the vehicle 111 or UE 113 in which the positioning receiver 101 is included. For example, is a vehicle 111 or UE 113 is equipped with a navigation application that uses the positioning receiver 101, a route that is input or selected using the navigation application can be used as the trajectory 109. In other words, the planned route of the vehicle 111 or UE 113 can be used as the trajectory 109 and the estimated time to travel the route (e.g., generated by the navigation application) can be used as the time span over which the trajectory 109 is to be traveled. In another embodiment, the trajectory 109 can be predicted based on a mobility graph associated with the positioning receiver 101, vehicle 111, UE 113, or a user associated with the vehicle 111/UE 113. The mobility graph, for instance, records historical travel patterns that can be used to predict the likely route or trajectory 109 to be taken by the positioning receiver 101.

It is noted that the embodiments of determining the trajectory 109 of the positioning receiver 101 described above is provided by way of illustration and not as limitations. Accordingly, it is contemplated that any process or means can be used to determine the trajectory 109 for base station selection according to the embodiments described herein.

In step 303, after determining the trajectory 109, the interval module 203 selects one or more locations along the trajectory 109 at which base station selection is to be performed. In one embodiment, the interval module 203 virtually traverses the determined trajectory 109 of the positioning receiver 101 to note or select geographic locations (e.g., latitude, longitude, altitude) along the trajectory 109 at selected intervals. The intervals between the geographic locations can be determined based on factors such as, but not limited to: density of the base stations 105, distance between selected base stations 105, length of the trajectory 109, speed of the positioning receiver 101 on the trajectory 109, etc. For example, in geographic areas in which the base station network 107 has a higher density base stations 105, the selected locations can be at closer intervals. On the other hand, the trajectory module 201 can use larger intervals to select locations if a minimum distance between selected base stations 105 is designated. For example, base stations 105 that are closer than a proximity threshold may not have conditions that would lead to differing errors between the two stations. As a result, the correction signals (e.g., based differences between their fixed locations and GNSS derived locations) broadcast by the close base stations 105 may not be significantly different, thereby leading to potentially unnecessary selection and processing of possibly redundant correction signals.

Figure 4A:
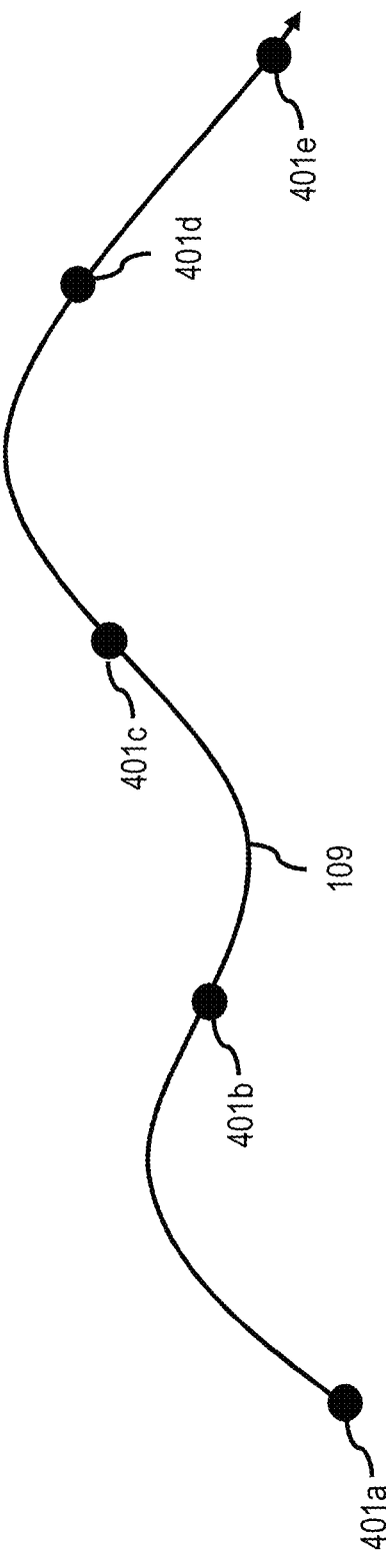
FIGS. 4A and 4B are diagrams illustrating an example of traversing a positioning receiver trajectory to select base stations for differential positioning, according to one embodiment.

FIG. 4A illustrates an example of selecting geographic locations at selected intervals along a trajectory 109. In this example, the trajectory module 201 virtually traverses the trajectory 109 and selects geographic locations 401*a*-401*e* (also collectively referred to as locations 401) at a designated interval along the trajectory 109. The example of FIG. 4A illustrates the selection of the locations 401 based on a static interval determined based on the factors described above. However, it is also contemplated that the interval can be dynamic. In other words, the trajectory module 201 can determine different intervals to apply along the trajectory 109 based on the specific factors associated with a given segment of the trajectory 109. For example, if the base station density in the first segment (e.g., first 40 km) of the trajectory 109 is high, the initial location selection interval can be closer. Then if the base station density decreases in the last segment (e.g., last 40 km) of the trajectory 109, the interval for that last segment can be further apart.

In step 305, after the locations 401 on the trajectory 109 are determined, the selection module 205 scans base a station network 107 to find base stations 105 for differential positioning based on the locations 401. In one embodiment, the selection module 205 automatically scans the base station network 107 to find the base station 105 closest to the geographic location 401 of each selected interval on the trajectory 109. By way of example, a base network 107 is generally operated by a service provider to provide base stations 105 located throughout a geographic service area. There can be any number of base station networks 107 operating competitively or cooperatively in a given geographic area. As previously described, the base stations 107 within the base station network 107 collect location measurements from positioning satellites to compute differences between satellite or GNSS based positions and the known fixed location of each base station 105 to compute location correction data or signals including offsets to be applied to receiver data 117 to improve positioning accuracy. The base stations 105 can then individually broadcast or otherwise provide location correction data or signals for differential positioning to improve the accuracy of satellite or GNSS based positioning systems. In one embodiment, scanning the base network 107 comprises querying the service provider of the base station network 107 for the fixed locations of the base stations 105 to determine which base station(s) are closest to the selected locations 401 on the trajectory 109. Alternatively, the locations of the base stations 105 can be queried from a geographic database 125 that stores data on the locations of the base stations 105.

While base stations 105 continuously record data (e.g., difference measurements and correction data/signals), the availability of the data is not guaranteed. For example, there can be data outages, server interruptions, and other reasons for station data to be unavailable for processing (e.g., post-processing and/or real-time processing). In one embodiment, the selection module 205 can identify the base stations 105 that do not have available data and ignore them for base station selection by prioritizing only the base stations 105 with available data. It is contemplated that the selection module 205 can use any means to determine data availability at a base station 105. As one example, to check for data available at a base station, the selection module 205 can perform a near-immediate request to ping a server associated with the base station 105 (e.g., an FTP server or equivalent) and check the availability of the base station data file (e.g., data file corresponding to the date and/or time of the determined trajectory 109 of the positioning receiver 101).

Figure 4B:
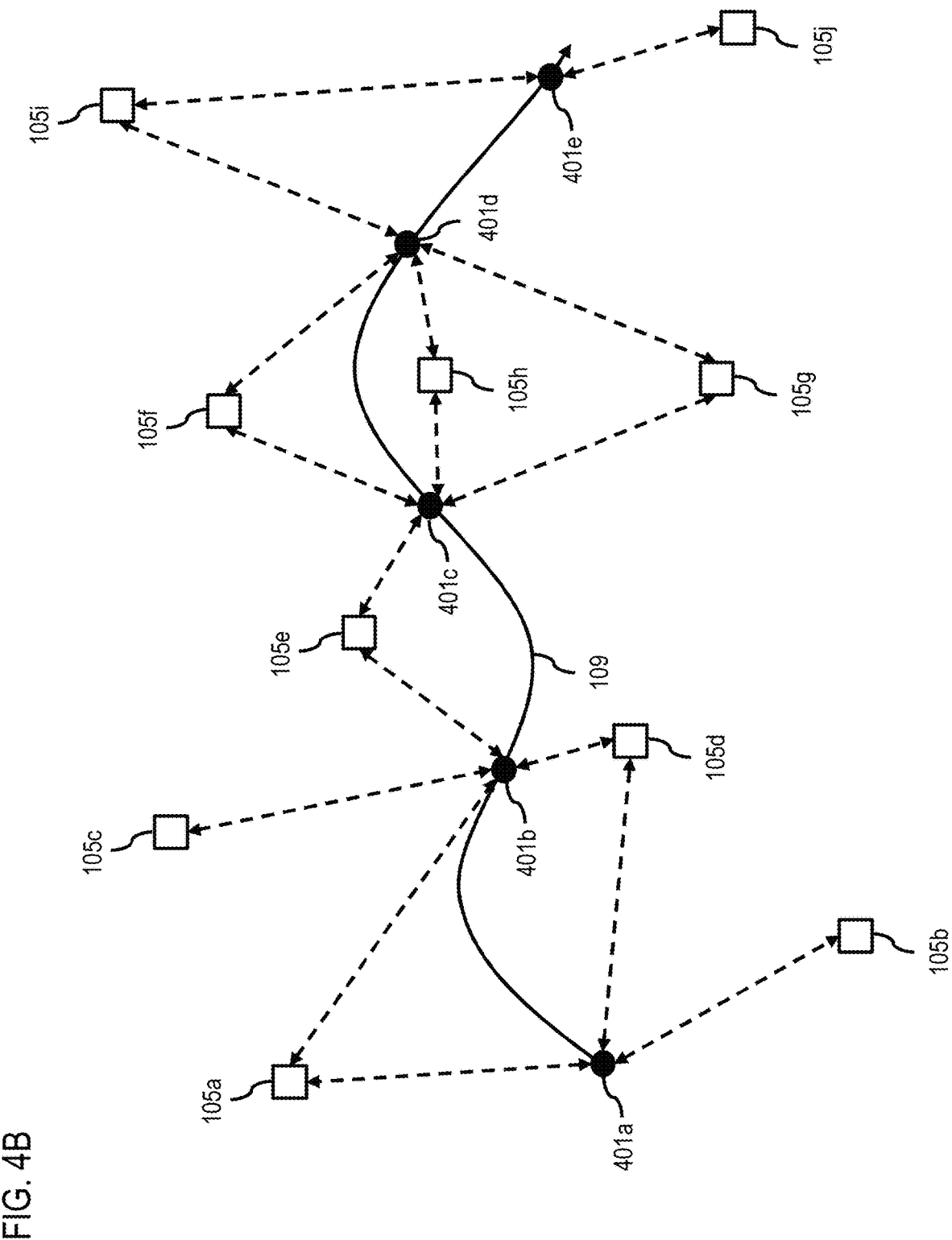

FIG. 4B illustrates an example of base station selection at locations 401 along a trajectory 109, according to one embodiment. FIG. 4B continues the example of FIG. 4A in which the trajectory 109 of the positioning receiver 101 has been determined and locations 401 at intervals along the trajectory 109 have been selected. In the example of FIG. 4B, the selection module 205 scans the base station network 107 for available base stations 105 around each selected location to determine closest base station. For example, at location 401a, a scan indicates that base stations 105a, 105b, and 105d are nearby with base station 105b being the closest in distance. Similarly, at location 401b, base stations 105c, 105d, and 105e are nearby with base station 105d being the closest. At location 401c, base stations 105e, 105g, 105h, and 105g are nearby with bases station 105h being the closest. At location 401d, base stations 105f, 105g, 105h, and 105i are nearby with base station 105h being the closest. Finally, at location 401e, base stations 105i and 105j are nearby with base station 105j being the closest.

In one embodiment, if the distance between a location on the trajectory 109 and a closest base station differs from the distance between the same location on the trajectory 109 and the next closest one or more base stations by less than a threshold distance, the selection module 205 can apply additional criteria to select between the closest and the one or more next closest base stations. The additional selection criteria can include but is not limited to how many common positioning satellites are visible to both the base station 105 and positioning receiver 101 at the location. For example, at location 401c, base station 105h is closest is physical distance and base station 105e is next closest. The difference between the respective distance of base stations 105e and 105h is less than a designated distance threshold. The selection module 205 can then determine how many commonly visible satellites there are between each base station 105e and 105h and the positioning receiver at location 401c. In this example, base station 105h shares 5 commonly visible satellites while base station 105e shares 6 commonly visible satellites. As a result, the selection module 205 can select base station 105e for location 401c even though the base station 105 is geographically closer to the location 401c.

In step 307, the output module 207 provides a list of base stations 105 selected for each location 401 on the trajectory 109 for differential positioning. In other words, after traversing the receiver data path (e.g., trajectory 109), a list is constructed of unique, available base stations 105 that are closest to the receiver path (e.g., trajectory 109) at some point (e.g., locations 401). Table 1 below illustrates an example of this list.

TABLE 1

| Location on Trajectory | Selected Base Station |
|---|---|
| Location 401a | Base Station 105b |
| Location 401b | Base Station 105d |
| Location 401c | Base Station 105e |
| Location 401d | Base Station 105h |
| Location 401e | Base Station 105j |

In one embodiment, the list of base stations 105 can be automatically ordered. For example, the base station with the shortest distance to the path or trajectory 109 can be ordered first in the list. The station with the longest distance to the path or trajectory 109 can be at the end of the list. Table 2 below illustrates an example of list of base stations ordered according to distance to the trajectory 109.

TABLE 2

| Location on Trajectory | Selected Base Station |
|---|---|
| Location 401d | Base Station 105h |
| Location 401c | Base Station 105e |
| Location 401b | Base Station 105d |
| Location 401e | Base Station 105j |
| Location 401a | Base Station 105b |

In one embodiment, the list of base stations 105 for the trajectory 109 can be provided for use by the mapping platform 121 for differential positioning to improve the accuracy of the receiver data 117. In addition or alternatively, the list of base stations 105 can be provided to one or more location-based applications and/or services that employ differential positioning. The location-based application and/or services can be provided by the services platform 127, any of the services 129a-129j (also collectively referred to as services 129) of the services platform 127, one or more content providers 131a-131k (also collectively referred to as content providers 131), and/or any other component of the system 100.

Figure 5:
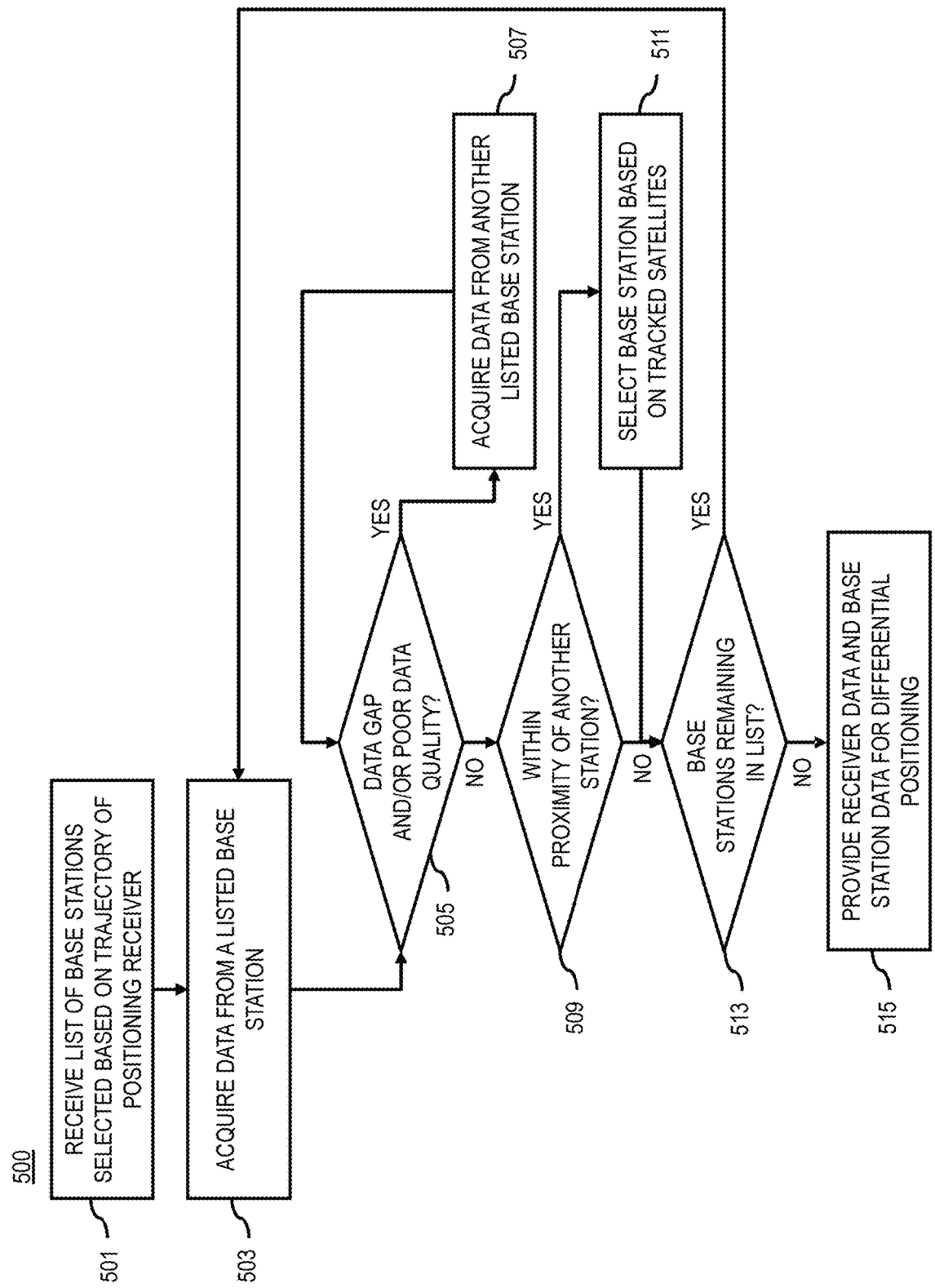
FIG. 5 is a flowchart of a process for acquiring base station data for differential positioning, according to one embodiment.

FIG. 5 is a flowchart of a process for acquiring base station data for differential positioning, according to one embodiment, according to one embodiment. In various embodiments, the mapping platform 121 and/or the modules 201-207 may perform one or more portions of the process 500 and may be implemented in, for instance, a chip set including a processor and a memory as shown in FIG. 9. As such, the mapping platform 121 and/or modules 201-207 can provide means for accomplishing various parts of the process 500, as well as means for accomplishing embodiments of other processes described herein in conjunction with other components of the system 100. Although the process 500 is illustrated and described as a sequence of steps, it is contemplated that various embodiments of the process 500 may be performed in any order or combination and need not include all of the illustrated steps.

In step 501, the mapping platform 121 receives a list of base stations 105 for differential positioning. The list, for instance, can be generated according to the process 300 of FIG. 3 above. In one embodiment, the mapping platform 121 can address the list of base stations 105 sequentially beginning from the first station. In embodiments, where the list is ordered by distance to the trajectory, this results in the mapping platform 121 addressing the list of base stations 105 based on their respective distances from the trajectory 109 of the corresponding positioning receiver 101. According, the step 503, the mapping platform 121 can acquire the data (e.g., the base station data 119 including, for instance, differential location correction data or signals) from a base station 105 on the list. For example, the mapping platform 121 can begin by acquiring the differential location correction data from the first listed station (step 503).

In step 505, after acquiring the available data from the listed base station 105, the mapping platform 121 can the confirm the absence of base station data gaps during the trajectory 109. In other words, the mapping platform 121 can determine whether the data retrieved from the base station 105 is missing for are any time periods during which the positioning receiver 101 is on the trajectory 109. For example, if the trajectory 109 is determined during post-processing of probe data resulting from a drive session, the mapping platform 121 can determine the time period of the trajectory 109 spans from the time indicated on the timestamp of the first probe in the trajectory 109 to the time indicated on the timestamp of the last probe in the trajectory 109. The mapping platform 121 can then check the acquired base station data 119 to determine there is adjustment or differential data available covering the entirety of trajectory time span. If there are gaps in the base station data 119 spanning more than a threshold time period, the mapping platform 121 can reject the base station 105 and try the next base station 105 on the list (step 507). The mapping platform 121 can proceed through the list of base stations 105 until it finds a base station 105 having no data gaps.

In one embodiment, during step 505, the mapping platform 121 can also check the quality of the acquired data. When the downloaded base station data 119 is poor quality data, it can cause processing results to degrade, or even fail. The mapping platform 121 can check for data quality by determining the noise or variance in the acquired data. For example, if the correction data from the base station 105 has a variance or noise above a threshold value, the mapping platform 121 can reject the base station 105 and try next base station 105 on the list (step 507). As indicated above, High variance or noise (e.g., above a variance threshold) in the base station data 119 can lead to processing degradation or failures. For example, applying a Kalman filter to raw differential positioning data (e.g., including the base station data 119 acquired from the listed base station 105) can be used to effectively remove noise and reduce positioning error. However, if the Kalman filter is fed low quality data (e.g., high variance data), the low quality data can potentially cause filter resets that lead to poor quality noise remove or error reduction or failure of the process altogether. In one embodiment, if greater than a threshold percentage of the station data 119 is classified as poor quality (e.g., has high variance or causes filter resets), the mapping platform 121 can reject the base station 105.

In one embodiment, the mapping platform 121 can apply a check to determine that base stations 105 from which it acquires base station data 119 is not too close another base station 105 that can or has been selected. In other words, the mapping platform 121 can determine whether the base station 105 being evaluated is within a proximity threshold to another base station 105 on the list (step 509). In some cases, using two base stations 105 that are too close to each other adds no value to improving positioning accuracy (i.e., does not improve positioning accuracy) and will only increase processing time because generally the errors experienced at two nearby base stations 105. An exception to this observation is that if a base station is very close to another base station, but it tracks more GNSS constellations and/or positioning satellites in common with the receiver data 117 or positioning receiver 101. In this case, at step 511, the mapping platform 121 can select the base station 105 that tracks more GNSS constellations and and/or satellites as the positioning receiver 101 or receiver data 117. For example, if the receiver 101 tracks GPS+GLONASS constellations and there are the two closely spaced base stations 105, one of which tracks GPS and the other tracks GPS+GLONASS, the mapping platform 121 can select the base station 105 that tracks GPS+GLONASS.

In step 513, after a base station 105 on the list is selected and verified for gaps and quality, the mapping platform 121 can determine whether there are any base stations 105 remaining on the list. If there are any base stations 105 remaining, the mapping platform 121 continues through the list of stations. When the list is ordered by distance to the trajectory, the mapping platform 121 effectively continues to process the base stations 105 that are closest to the trajectory 109 or drive path at the selected locations 401 or points first. In one embodiment, additional base stations 105 can have data gaps that can be tolerated if the first base station or a previously selected base station was verified to span the drive time completely. In addition, if the base station data 119 is not poor quality, the corresponding additional stations are used.

In step 515, after processing the list of base stations 105, the mapping platform 121 can provide the receiver data 117 (e.g., GNSS data received directly at the positioning receiver 101) and the base station data 119 from the base stations 105 determined from the trajectory 109 of the positioning receiver 101 for differential positioning processing and Kalman filtering (or equivalent) to improve positioning accuracy.

Figure 6:
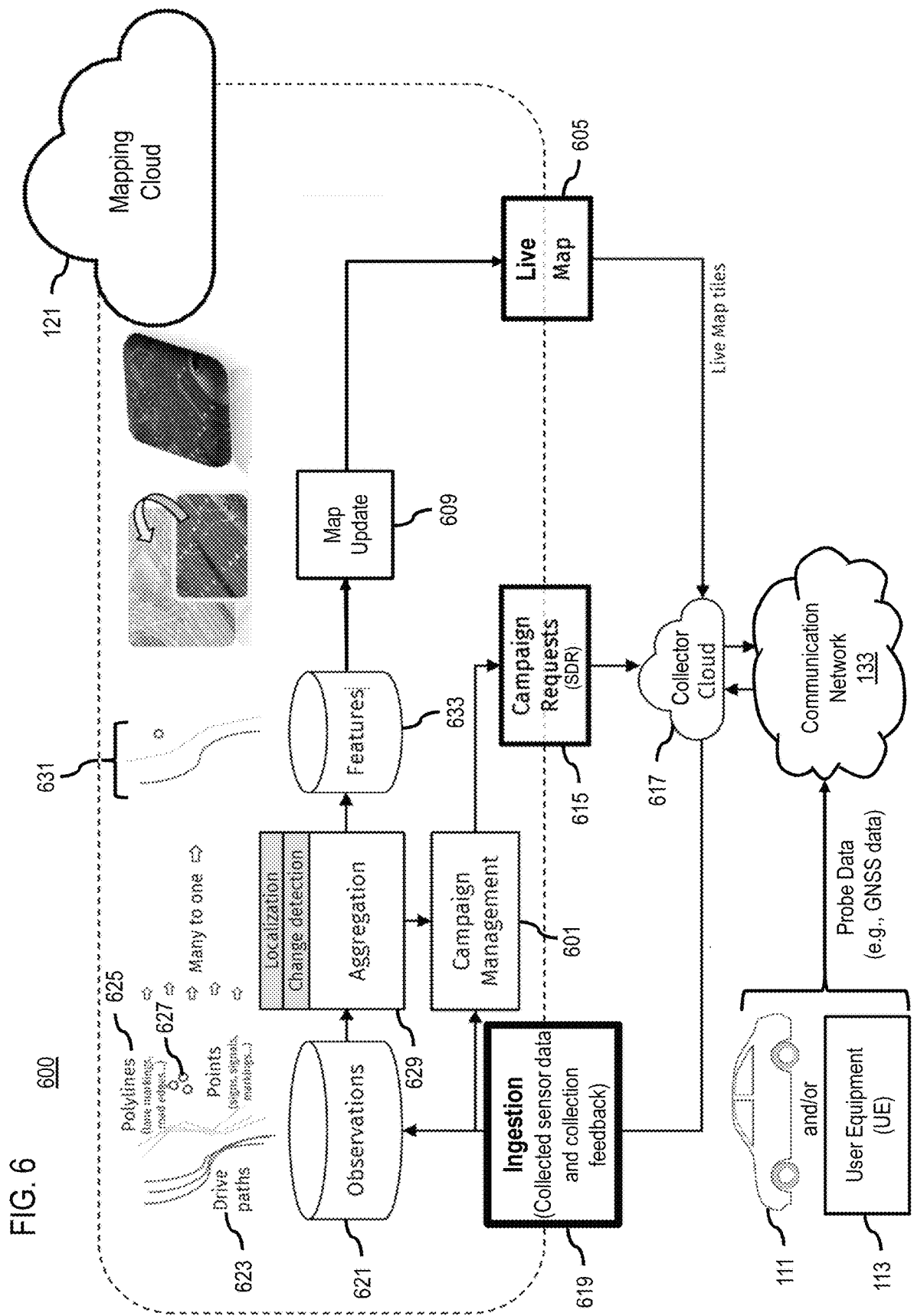
FIG. 6 is a diagram illustrating an example production environment that uses receiver trajectory to select base stations for differential positioning, according to one embodiment.

As discussed above, the embodiments of base station selection for differential positioning can be used in a large production environment such as for digital map making. FIG. 6 is a diagram illustrating an example of such an environment, according to one embodiment. The environment 600 of FIG. 6 is a digital map making pipeline that is based on collecting probe data from vehicles 111 and/or UEs 113 to update or create map data. The probe data includes location data determined from positioning receivers 101 whose accuracy can be improved using differential positioning. In addition, the drive trajectories can be derived from the probe data, and these trajectories can be used for base station selection for differential positioning to improve positioning accuracy according to the embodiments described herein. This improved positioning accuracy also results in improving the accuracy of map data derived from differential positioning systems.

Map data (e.g., stored in a live map 605, e.g., a geographic database 125) is an important source of guidance for vehicles and other end users, so this map data needs to be correct, accurate, and up to date to provide accurate representation of the world or environment in which the vehicles operates. However, the world is not static. It is constantly shifting and evolving. Mapping systems (e.g., a cloud-based mapping platform 121) that support map-based services must therefore constantly detect, verify, and update the changes that are happening in the world and make appropriate updates to the digital map data of live map 605). One way for the mapping platform 121 to obtain this level of freshness is to collect probe data or probe trajectories from positioning receivers 101 installed on vehicle fleets (e.g., vehicles 111) and/or mobile devices associated with the vehicles 111 (e.g., UE devices 113) in order to adapt and match to the constantly changing environment. In other words, the live map 605 or the digital map data stored therein needs an ability to "self-heal" by filling in map data for newly discovered areas, validating map data in existing areas, and/or updating previously generated map data as needed.

In one embodiment, campaign or sensor data requests (SDRs) 615 for probe data can be created and managed by a campaign management platform 601. The campaign management platform 601 can be a part of the overall cloud-based mapping platform 121 or operate as a standalone component or a component of any other system/platform. In one embodiment, the campaign management platform 601 can determine the need for probe data for any given geographic extent or road segment, based on a number of considerations, including map data age, refresh history, and/or new road discovery, among others. Vehicles 111 and/or UEs 113 can then transmit probe data to the cloud in response to a sensor data request 615 by the campaign management platform 601. By way of example, the cloud includes any server-side component of the system 100 including, but not limited to a collector cloud platform 617 (e.g., responsible for fulfilling SDRs by collecting data from vehicles 111 and/or UEs 113), the campaign management platform 601, and/or the mapping platform 121.

In one embodiment, campaign management platform 601 generates or receives input for creating campaigns to collect probe data to the meet the specific needs (e.g., map validation campaign, map discovery campaign, and/or map update campaign). For example, a campaign is a commitment by a fleet of vehicles 111 to collect probe data in order to create or maintain digital map data in an area for a length of time. The probe data resulting from these campaigns can be fed into a map learning pipeline comprising, for instance, an ingestion module 619 for aggregating probe data received in response to active sensor data requests transmitted from the campaign management platform 601.

The ingestion module 619 can store the receive probe data observations in an observations database 621 or equivalent data store (e.g., probe database 123). Examples of the probe data observations include but are not limited to:

(1) Vehicle drive or pose paths 623 comprising a time-ordered sequence to probe or location points (e.g., GPS location points) with each location point specifying a time-stamped location and heading (e.g., pose) of the collecting vehicle 111;
(2) Polylines 625 representing detected lane markings, road edges, and/or any other linear map feature; and
(3) Points 627 represented detected signs, signals, poles, markings, and/or any other map feature that can be represented using a point location.

In some cases, the observations in the observations database 621 can include multiple observations of the same map feature. Accordingly, an aggregation module can aggregate the multiple observations (e.g., cluster based on distance or other clustering means) to covert the many observations to one corresponding observation 631 for different map feature to store in the features database 633. In addition, the aggregation module can localize the observations against the digital map data of the live map 605 to perform change detection. Based on any detected changes, the aggregation module 629 can signal the campaign management platform 601 to initiate additional campaigns (e.g., initiate an update campaign if a map feature has changed or been newly detected).

The map learning pipeline then continues by converting any new or updated map features stored in the features database 633 into a map update 609 package to update the digital map data of the live map 605. In one embodiment, the live map 605 is compiled from data streams of digital map data in a standard format (e.g., Navigation Data Standard (NDS) format or equivalent) along with data streams of real-time and/or substantially real-time data (e.g., live map data). To complete the mapping pipeline the published live map 605 can then be made available to the end user (e.g., vehicle 111 and UE 113) over the communication network 133 or other downloaded media.

Returning to FIG. 1, in one embodiment, the mapping platform 121 may be a platform with multiple interconnected components. For example, the mapping platform 121 may include multiple servers, intelligent networking devices, computing devices, components and corresponding software for providing base station selection for differential positioning.

By way of example, the UE 113 can be any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 113 can support any type of interface to the user (such as "wearable" circuitry, etc.). In one embodiment, the UE 113 may be associated with the vehicle 111 or be a component part of the vehicle 111.

In one embodiment, the vehicle 111 is configured with various sensors for generating or collecting probe data, vehicular sensor data, related geographic/map data, etc. In one embodiment, the sensed data represent sensor data associated with a geographic location or coordinates at which the sensor data was collected. In one embodiment, the probe data and/or the locations associated with the sensor readings can be determined using differential positioning according to one or more embodiments of the trajectory-based base selection process described herein. By way of example, the sensors collecting this location-based sensor data may include a radar system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on steering wheels of the vehicles, switch sensors for determining whether one or more vehicle switches are engaged, and the like.

Other examples of sensors of the vehicle 111 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle 111 may detect the relative distance of the vehicle from a VRU, a physical divider, a lane or roadway, the presence of other vehicles, pedestrians, traffic lights, potholes and any other objects, or a combination thereof. In one scenario, the sensors may detect weather data, traffic information, or a combination thereof. In one embodiment, the vehicle 111 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 133 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 121, vehicle 111, and/or UE 113 communicate with each other and other components of the system 100 using well known, new or still developing protocols. In this context, a protocol includes a set of rules defining how the network nodes within the communication network 133 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 7:
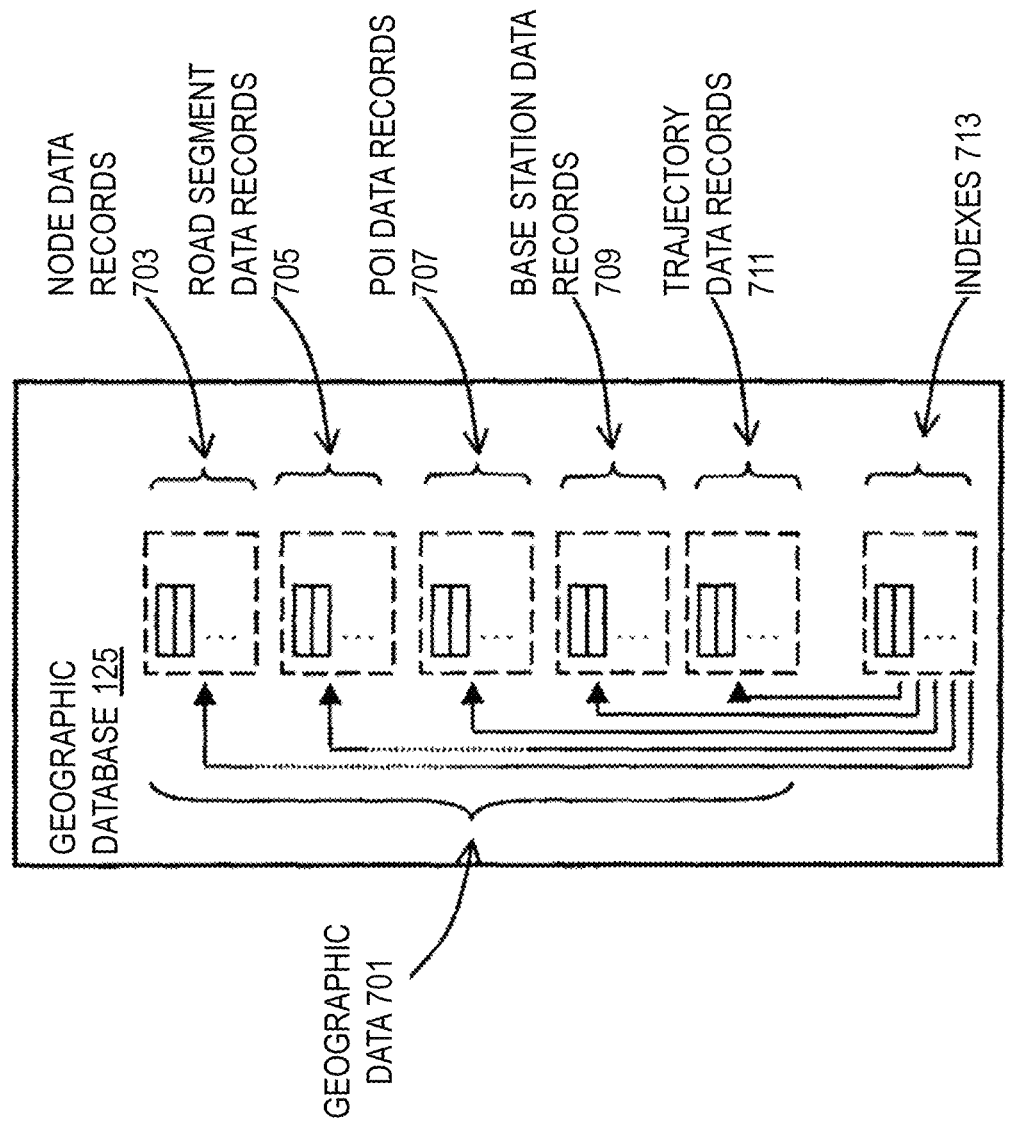
FIG. 7 is a diagram of a geographic database, according to one embodiment.

FIG. 7 is a diagram of a geographic database 125, according to one embodiment. In one embodiment, geographic database 125 includes geographic data 701 used for (or configured to be compiled to be used for) mapping and/or navigation-related services, such as for step counting to access a POI pickup point, video odometry based on mapped features, e.g., lane lines, road markings, signs, etc.

In one embodiment, geographic features, e.g., two-dimensional or three-dimensional features, are represented using polygons, e.g., two-dimensional features, or polygon extrusions, e.g., three-dimensional features. For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in geographic database 125.

"Node"—A point that terminates a link.

"Line segment"—A straight line connecting two points.

"Link" (or "edge")—A contiguous, non-branching string of one or more-line segments terminating in a node at each end.

"Shape point"—A point along a link between two nodes, e.g., used to alter a shape of the link without defining new nodes.

"Oriented link"—A link that has a starting node (referred to as the "reference node") and an ending node (referred to as the "non-reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary, e.g., a hole or island. In one embodiment, a polygon is constructed from one outer simple polygon and none or at least one inner simple polygon. A polygon is simple if it just consists of one simple polygon, or complex if it has at least one inner simple polygon.

In one embodiment, the geographic database 125 follows certain conventions. For example, links do not cross themselves and do not cross each other except at a node. Also, there are no duplicated shape points, nodes, or links. Two links that connect each other have a common node. In geographic database 125, overlapping geographic features are represented by overlapping polygons. When polygons overlap, the boundary of one polygon crosses the boundary of the other polygon. In geographic database 125, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 125 includes node data records 703, road segment or link data records 705, POI data records 707, base station data records 709, trajectory data records 711, and indexes 713, for example. More, fewer or different data records can be provided. In one embodiment, additional data records (not shown) can include cartographic ("carto") data records, routing data, and maneuver data. In one instance, the additional data records (not shown) can include user mobility pattern data. In one embodiment, the indexes 713 may improve the speed of data retrieval operations in geographic database 125. In one embodiment, the indexes 713 may be used to quickly locate data without having to search every row in geographic database 125 every time it is accessed. For example, in one embodiment, the indexes 713 can be a spatial index of the polygon points associated with stored feature polygons.

In exemplary embodiments, the road segment data records 705 are links or segments representing roads, streets, or paths, as can be used in the calculated route or recorded route information for determination of one or more personalized routes, an estimated time of arrival, or a combination thereof. The node data records 703 are end points corresponding to the respective links or segments of the road segment data records 705. The road link data records 705 and the node data records 703 represent a road network, such as used by vehicles, cars, and/or other entities. Alternatively, the geographic database 125 can contain path segment and node data records or other data that represent pedestrian paths, bicycle paths, or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 125 can include data about the POIs and their respective locations in the POI data records 707. In one instance, the POI data records 707 can include indoor map information, entry-exit point information (e.g., numbers and locations of entry-exit points), historic pedestrian traffic flows within the POI, historic vehicular traffic flows proximate to the POI, opening and closing times of a POI, etc.

In one embodiment, the indoor map information is created from high-resolution 3D mesh or point-cloud data generated, for instance, from LiDAR. The 3D mesh or point-cloud data are processed to create 3D representations of interior pathways, hallways, corridors, etc. of a POI at centimeter-level accuracy for storage in the POI data records 707.

In one embodiment, the geographic database 125 can also include base station data records 709. The base station data records 709 may data indicating available base stations networks 107 and the locations of the base stations 105. In one embodiment, the base station data records 709 can also store information on historical data availability, tracked GNSS constellations, tracked positioning satellites, and other data used or generated with respect to base station selection according to the embodiments described herein. In addition, the base station data records 709 can store the lists of selected based stations 105 associated with the corresponding trajectories 109 of tracked positioning receivers 101.

In one embodiment, the geographic database 125 can also include trajectory data records 711. The trajectory data records 711 can store data related to the determined trajectories 109 of positioning receivers 101. The trajectory data records 711 can also store information on the locations 401 and/or intervals for selecting the locations 401 along the trajectories 109 at which base station selection is to be performed. The trajectory data records 711 can be correlated with the base records 709 to indicate the selected list of base stations to use for differential positioning along the trajectories 109.

In one embodiment, geographic database 125 can be maintained by a content provider 131 in association with the services platform 127, e.g., a map developer. The map developer can collect geographic data to generate and enhance geographic database 125. There can be different ways used by the map developer to collect data. These ways can include obtaining data from other sources, such as municipalities or respective geographic authorities. Also, remote sensing, such as aerial or satellite photography, can be used for approximating interior distances.

The geographic database 125 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, a UE 113, for example. The navigation-related functions can correspond to pedestrian navigation, vehicle navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

In one embodiment, the live map 605 include high resolution or high definition (HD) mapping data that provide centimeter-level or better accuracy of map features. For example, the live map 605 can be based on Light Detection and Ranging (LiDAR) or equivalent technology to collect billions of 3D points and model road surfaces and other map features down to the number lanes and their widths. In one embodiment, the HD mapping data capture and store details such as the slope and curvature of the road, lane markings, roadside objects such as sign posts, including what the signage denotes. By way of example, the HD mapping data enable highly automated vehicles to precisely localize themselves on the road, and to determine road attributes (e.g., learned speed limit values) to at high accuracy levels.

In one embodiment, the live map 605 is stored as a hierarchical or multi-level tile-based projection or structure. More specifically, in one embodiment, the live map 605 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The processes described herein for providing base station selection for differential positioning may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
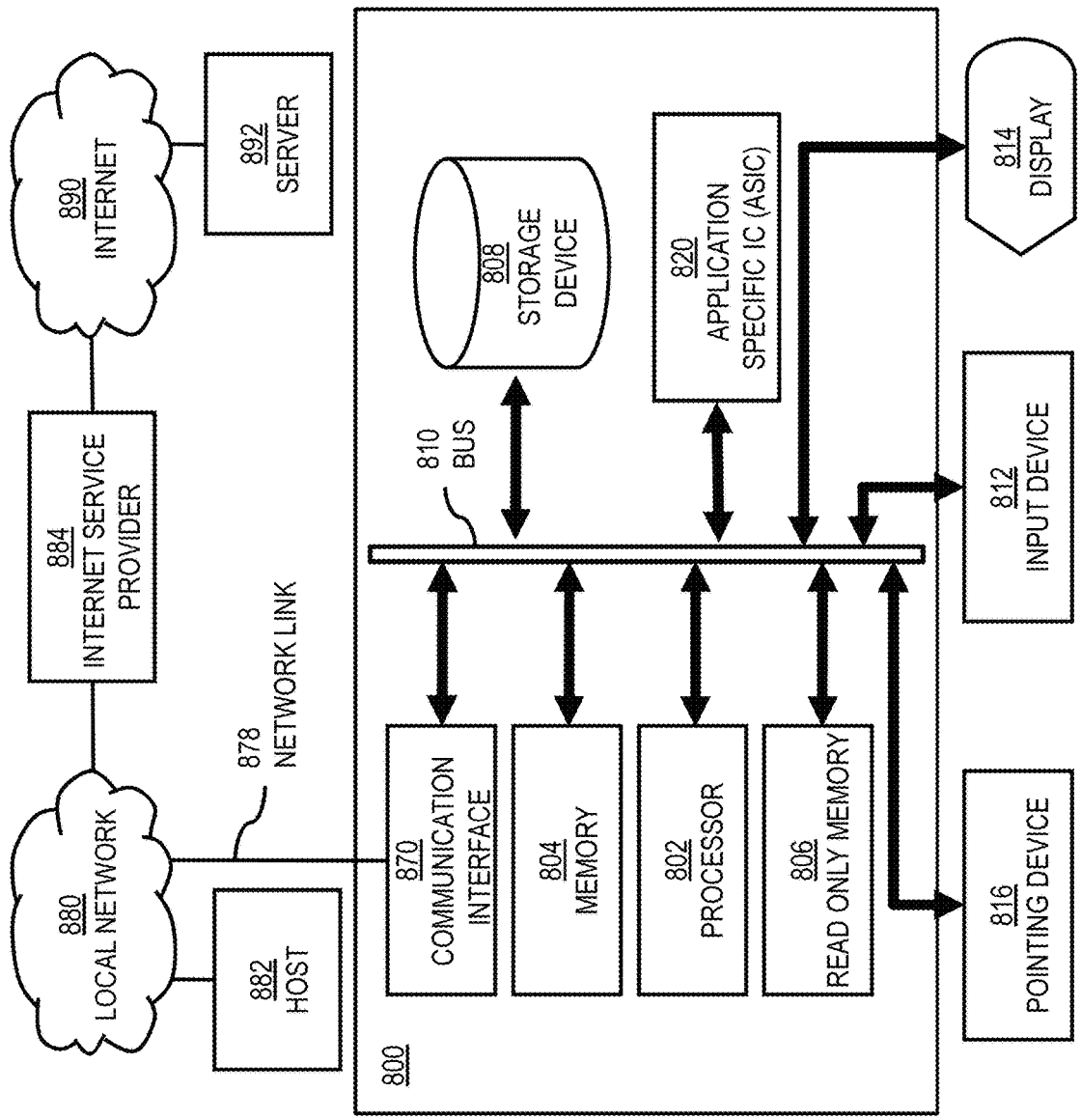
FIG. 8 is a diagram of hardware that can be used to implement an embodiment.

FIG. 8 illustrates a computer system 800 upon which an embodiment of the invention may be implemented. Computer system 800 is programmed (e.g., via computer program code or instructions) to provide base station selection for differential positioning as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to providing base station selection for differential positioning. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for providing base station selection for differential positioning. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing base station selection for differential positioning, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general, the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 133 for providing base station selection for differential positioning.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system can be deployed in various configurations within other computer systems, e.g., host 882 and server 892.

FIG. 9 illustrates a chip set 900 upon which an embodiment of the invention may be implemented. Chip set 900 is programmed to provide base station selection for differential positioning as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide base station selection for differential positioning. The memory 905 also stores the data associated with or generated by the execution of the inventive steps.

Figure 10:
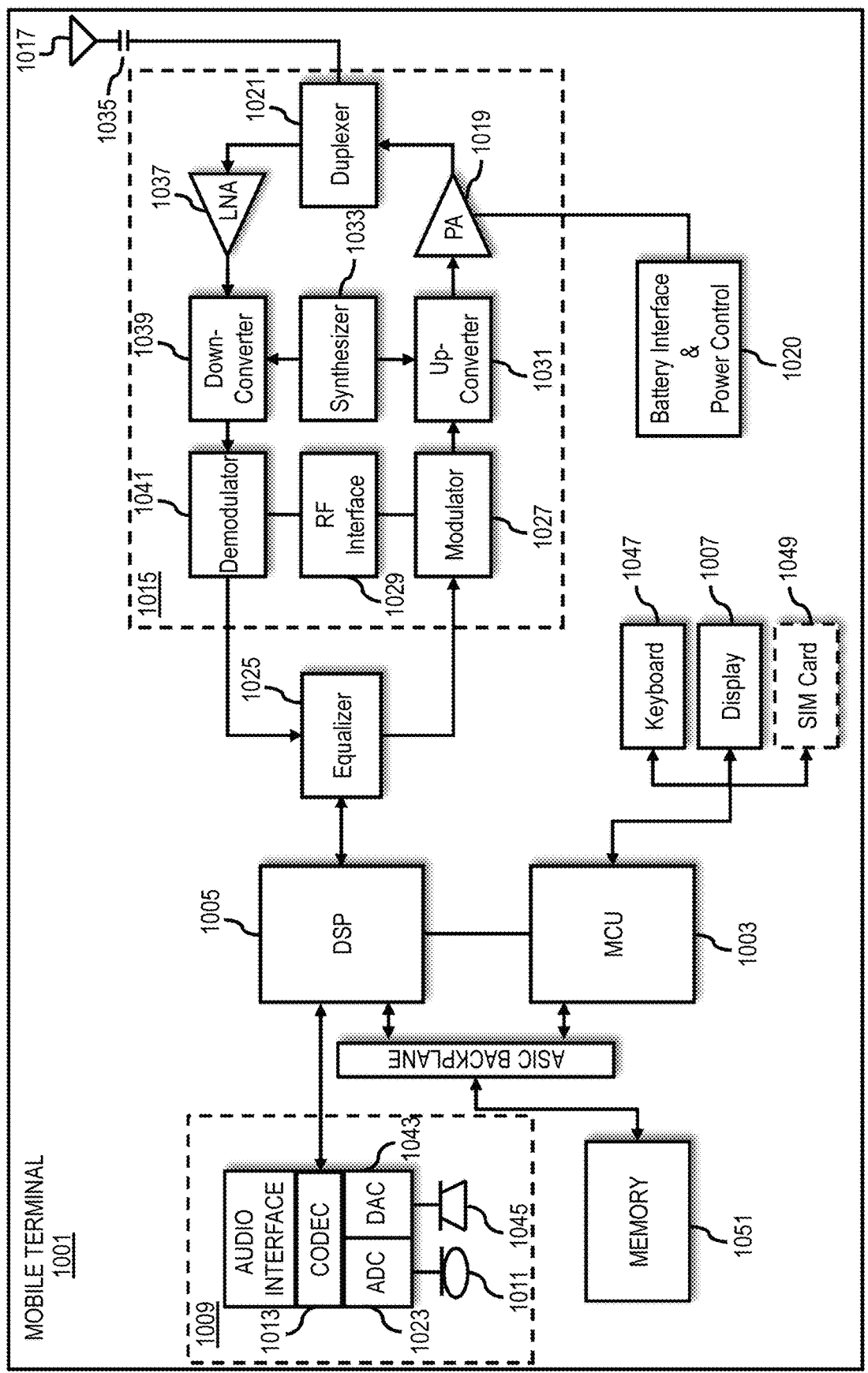
FIG. 10 is a diagram of a mobile terminal (e.g., handset or vehicle or part thereof) that can be used to implement an embodiment.

FIG. 10 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions that offer automatic contact matching. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile station 1001 to provide base station selection for differential positioning. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1051 may be, but not limited to, a single memory, CD, DVD, ROM, RAM, EEPROM, optical storage, or any other non-volatile or non-transitory storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining a trajectory of a positioning receiver, wherein the positioning receiver provides data for using a differential positioning system to determine location data;
    selecting one or more locations along the trajectory;
    scanning a base station network comprising a plurality of base stations to find one or more base stations of the base station network for the one or more locations, wherein the one or more base stations provide location correction data for differential positioning; and
    providing a prioritized list of a plurality of the base stations capable of performing the differential positioning.

2. The method of claim 1, wherein the one or more locations are selected by traversing the trajectory at selected intervals.

3. The method of claim 1, wherein the scanning of the base station network comprises determining that the location correction data is available from the one or more base stations.

4. The method of claim 1, wherein the one or more base stations are found based on proximity to the one or more locations.

5. The method of claim 1, wherein the one or more base stations are found based on a number of positioning satellites common to positioning receiver and the one or more base stations.

6. The method of claim 1, wherein the one or more base stations are found based on determining that the one or more base stations are more than a distance threshold apart.

7. The method of claim 1, further comprising:
    acquiring the location correction data from the one or more base stations based on the list.

8. The method of claim 1, further comprising:
    acquiring the location correction data from a base station on the list; and
    selecting another base station on the list to acquire the location correction data based on determining at least one of:
        that there is a gap in the location correction data from the base station; and
        that the location correction data from the base station has a data quality below a threshold value.

9. The method of claim 1, wherein the list is ordered sequentially based on proximity to the trajectory at the one or more locations.

10. An apparatus comprising:
    at least one processor; and
    at least one memory including computer program code for one or more programs,
    the at least one memory and the computer program code configured to, with the at least one processor, cause the apparatus to perform at least the following, comprising:
        determine a trajectory of a positioning receiver, wherein the positioning receiver provides data for using a differential positioning system to determine location data;
        select one or more locations along the trajectory;
        scan a base station network comprising a plurality of base stations to find one or more base stations of the base station network for the one or more locations, wherein the one or more base stations provide location correction data for differential positioning; and
        provide a prioritized list of a plurality of the base stations capable of performing the differential positioning.

11. The apparatus of claim 10, wherein the one or more locations are selected by traversing the trajectory at selected intervals.

12. The apparatus of claim 10, wherein the scanning of the base station network causes the apparatus to determine that the location correction data is available from the one or more base stations.

13. The apparatus of claim 10, wherein the one or more base stations are found based on proximity to the one or more locations.

14. The apparatus of claim 10, wherein the one or more base stations are found based on a number of positioning satellites common to positioning receiver and the one or more base stations.

15. The apparatus of claim 10, wherein the one or more base stations are found based on determining that the one or more base stations are more than a distance threshold apart.

16. A non-transitory computer-readable storage medium carrying one or more sequences of one or more instructions which, when executed by one or more processors, cause an apparatus to perform:
    determining a trajectory of a positioning receiver, wherein the positioning receiver provides data for using a differential positioning system to determine location data;
    selecting one or more locations along the trajectory;
    scanning a base station network comprising a plurality of base stations to find one or more base stations of the base station network for the one or more locations, wherein the one or more base stations provide location correction data for differential positioning; and
    providing a prioritized list of a plurality of the base stations capable of performing the differential positioning.

17. The non-transitory computer-readable storage medium of claim 16, wherein the one or more locations are selected by traversing the trajectory at selected intervals.

18. The non-transitory computer-readable storage medium of claim 16, wherein the scanning of the base station network causes the apparatus to determine that the location correction data is available from the one or more base stations.

19. The non-transitory computer-readable storage medium of claim 16, wherein the one or more base stations are found based on proximity to the one or more locations.

20. The non-transitory computer-readable storage medium of claim 16, wherein the one or more base stations are found based on a number of positioning satellites common to positioning receiver and the one or more base stations.

* * * * *